(12) United States Patent
Lair

(10) Patent No.: US 6,546,716 B2
(45) Date of Patent: Apr. 15, 2003

(54) JET ENGINE NOZZLE WITH VARIABLE THRUST VECTORING AND EXHAUST AREA

(75) Inventor: Jean-Pierre Lair, 127 Paddington Way, San Antonio, TX (US) 78209

(73) Assignee: Jean-Pierre Lair, Tulsa, OK (US)

(*) Notice: Subject to any disclaimer, the term of this patent is extended or adjusted under 35 U.S.C. 154(b) by 0 days.

(21) Appl. No.: 09/842,178

(22) Filed: Apr. 26, 2001

(65) Prior Publication Data

US 2002/0158146 A1 Oct. 31, 2002

(51) Int. Cl.[7] .............................. F02K 1/10; F02K 1/11
(52) U.S. Cl. ................ 60/232; 239/265.33; 239/265.35
(58) Field of Search .......................... 60/230, 232, 228; 239/265.19, 265.23, 265.33, 265.35, 265.37

(56) References Cited

U.S. PATENT DOCUMENTS

| | | | | |
|---|---|---|---|---|
| 2,680,948 A | * | 6/1954 | Greene | 239/265.37 |
| 2,735,264 A | * | 2/1956 | Jewett | 239/265.37 |
| 3,058,449 A | * | 10/1962 | Corbett | 60/232 |
| 3,685,737 A | * | 8/1972 | Ronald | 239/265.19 |
| 4,194,692 A | * | 3/1980 | Dickenson | 239/265.33 |
| 4,508,270 A | * | 4/1985 | Joubert | 239/265.35 |
| 4,763,840 A | * | 8/1988 | Madden | 239/265.35 |
| 4,836,451 A | * | 6/1989 | Herrick et al. | 60/232 |
| 5,176,340 A | * | 1/1993 | Lair | 239/265.19 |
| 5,221,048 A | | 6/1993 | Lair | |
| 5,833,140 A | * | 11/1998 | Loffredo et al. | 239/265.37 |

* cited by examiner

*Primary Examiner*—Ted Kim
(74) *Attorney, Agent, or Firm*—Collier Shannon Scott, PLLC; David R. Yohannan

(57) ABSTRACT

A variable area exhaust nozzle with a variable thrust vector angle for a turbo-fan engine and mounted on the aft portion of the nacelle which wraps said engine. The nozzle may include a fixed structure having at least two lateral arms separating two radial cutouts. The cutouts are positioned one above the other, one being located above the engine axis, the other one below the engine axis. At least two shells close the fixed structure cutouts and are pivotally mounted on the fixed structure to form a portion of the exhaust nozzle of the engine. A sealing means ensures fluid tightness between the shells and the fixed structure for any angular position of said shells. Actuator means are provided for pivoting the shells either to a symmetrical configuration for changing of the value of the exhaust area of the nozzle or to an unsymmetrical configuration for changing the angle of the thrust vector of the exhaust nozzle. In operation, the value of the exhaust area and the thrust vector angle of the exhaust nozzle are varied during flight to optimize performance of the aircraft.

14 Claims, 13 Drawing Sheets

NOMINAL  NOMINAL - X%  NOMINAL + Y%

JET ENGINE NOZZLE WITH VARIABLE THRUST VECTORING AND EXHAUST AREA

FIELD OF THE INVENTION

The present invention relates to an exhaust nozzle for jet engines. Such a nozzle may be used on business aircraft and for commercial aircraft for optimizing their take-off, climb and cruise performance, as well as for increasing safety in flight and reducing speed at landing.

BACKGROUND OF THE INVENTION

Variable area exhaust nozzles are known in the art. For example, U.S. Pat. No. 5,221,048, which is incorporated by reference herein, describes a variable exhaust area nozzle comprising a fixed structure having mounted thereon two pivoting half shells that cooperate radially and longitudinally with said fixed structure. The two shells and the fixed structure on which they are mounted form the rear part of the nacelle that encloses the engine. Thus, the two shells and the fixed structure form the exhaust nozzle of the engine. Fluid tightness between the two half shells and the fixed structure is provided by a sealing arrangement. Actuators are used to pivot the shells into any position between their fully opened position and their fully closed position. The variation of the position of the shells provides adjustment of the value of the nozzle exhaust area to that required for optimum performance of the engine. Although adjustment of the position of the two shells provides control over the nozzle exhaust area, it does so without modification of the engine thrust vector angle.

Variable nozzle and thrust vectoring of the exhaust of a jet engine is known. U.S. Pat. No. 4,000,610, which is incorporated by reference herein, discloses an apparatus using a flap downstream of a series of converging-diverging flaps to provide flight maneuver (thrust) vectoring as well as external exhaust expansion control. While the series of flaps are internal to the nozzle, and are adapted to form a convergent-divergent shape, they cooperate with the one flap located downstream of the exhaust nozzle for external expansion control of the exhaust. Convergent-divergent nozzles such as this are typically used on supersonic aircraft such as military aircraft.

Thrust vectoring technology has been successfully demonstrated on tactical military aircraft to provide maneuvering advantages in very low speed, very high angle-of-attack flight regimes. Current research is exploring the benefits of using thrust vectoring to decrease cruise trim drag under high altitude and mid to high speed conditions. This technology has matured to the extent that it is being incorporated into military fighter aircraft.

As far as is known, thrust vectoring has not been used on commercial or business aircraft. Some of the reasons for this are that the technology is typically very complex, and involves many moving parts, which is detrimental to the overall dispatch reliability and operational cost of a business or commercial aircraft. Another reason that thrust vectoring has not been used on commercial or business aircraft is that these aircraft usually have little need for maneuvering agility. Despite the foregoing, the potential for improved safety and increased cruise efficiency that may result from the use of thrust vectoring would make it attractive to the commercial and business aircraft community if a simple thrust vectoring system having a low number of moving parts could be provided.

Thrust vectoring also could provide benefit to commercial and business aircraft by providing improved longitudinal stability. Longitudinal stability is needed due to the fact that aircraft are designed to have an aerodynamic center of pressure (CP) located aft of the aircraft center of gravity (CG). As a result of this arrangement, cruising aircraft inherently have a nose down pitching moment, caused by the CP being aft of the CG. This nose down moment must be offset during flight by a nose up pitching moment created by the horizontal stabilizer. These opposing forces help maintain stability but create drag, which can reduce aircraft efficiency.

Thrust vectoring may be used to assist in the provision of aircraft longitudinal stability and the reduction of overall drag during cruising by placing the exhaust nozzle in a "nozzle up" position. When the thrust vector is directed upwards, the vertical component of the thrust vector creates a nose up pitching moment for the aircraft. The nose up pitching moment produced by the thrust vector allows the horizontal stabilizer to be operated at a lower angle-of-attack which reduces the negative lift created by the aircraft horizontal stabilizer and therefore reduces the aircraft drag. Furthermore, integration of the thrust vectoring system into the flight control system assists in providing aircraft longitudinal stability, thus allowing highly efficient reduced-tail designs, which in turn may reduce tail weight and consequently the overall aircraft weight.

Swept wing, T-tailed aircraft tend to suffer a marked nose up pitching moment at aerodynamic stall which can allow the low energy turbulent airflow behind the wing to immerse the tail. This can greatly reduce the effectiveness of the tail in countering the nose up pitching moment. When the nose up pitching moment created by the wing during stall is greater than the nose down pitching moment created by the horizontal tail, recovery from the stall may be impossible. Just as thrust vectoring may be used to assist the tail in providing a nose up pitching moment during cruise, thrust vectoring may be used to assist the tail in providing a nose down pitching moment during stall. All that is required is that the nozzle be placed in a nozzle-down position.

Thrust vectoring may be used further to improve landing performance and decrease or eliminate the need for thrust reversers. Landing performance is predicated on the landing approach being carried out at a generally constant angle-of-attack. At a generally constant angle-of-attack, airspeed varies directly with the weight supported by the wing i.e., aircraft weight. Required runway length is a function of aircraft weight, approach speed, and aircraft braking ability. As the ability to increase runway length and decrease aircraft weight is somewhat limited, control over aircraft stopping distance is largely exercised through control of braking ability.

Most aircraft, at landing, use thrust reversers for deceleration. However, these reversers, which are used at landing for about 30 seconds, can produce catastrophic events if an inadvertent deployment occurs during flight. Thrust reversers are required primarily on a wet or icy runway, because of the high speeds at which aircraft are required to land. If the landing speed of aircraft could be reduced, the need for thrust reversers could potentially be avoided. Thus, there is a need for aircraft engines that enable the landing speed of an aircraft to be reduced.

One such method of reducing aircraft landing speed may be to provide an engine that assists in lift through adjustment of the engine thrust vector. By placing the exhaust nozzle in a nozzle-down position, some portion of the aircraft weight may be supported directly by the vertical component of the vectored thrust thus reducing the weight supported by the wing. This support of the aircraft by a vertical component of thrust vectoring could be used to reduce approach speeds, and thus reduce landing speeds. Reduced landing speeds could decrease or eliminate the need for thrust reversers on the aircraft. Induced drag would be decreased and angle-of-attack reduced.

Thrust vectoring may also be used to assist in maneuvering an aircraft. For fuselage mounted engines in particular, the left engine exhaust nozzle can be controlled to an asymmetrical vectoring position (nozzle up for example) while the exhaust nozzle of the right engine is controlled to the opposite direction (nozzle down position), and vice versa. Such thrust vectoring may be used to generate a rolling moment to the aircraft. If the thrust vectoring system is integrated into the flight control and/or auto-flight systems, then an independent backup flight control system is available to the flight crew. Furthermore, if power for the thrust vectoring system is different from the flight control system i.e., electric vs. hydraulic, then an additional level of redundancy is created, which further increases the overall safety of the aircraft. On a multi-engine aircraft, pitch axis thrust vectoring can create aircraft movement about the pitch (symmetrical vectoring) and roll (asymmetrical vectoring) axes.

The system described and claimed herein, may provide the foregoing advantages and is an improvement over the systems disclosed in U.S. Pat. Nos. 5,221,048 and 4,000,610. As compared with these prior systems, various embodiments of the present invention require fewer moving parts, are not complex, and are relatively inexpensive, while allowing for variation of both the nozzle exhaust area and the engine thrust vector angle. This permits both exhaust area and thrust vector angle to be adjusted for optimized engine performance during different flight conditions.

OBJECTS OF THE INVENTION

It is therefore an object of the present invention to provide a jet engine nozzle with thrust vectoring capabilities.

It is another object of the present invention to provide a jet engine nozzle with variable exhaust area capabilities.

It is yet another object of the present invention to provide a jet engine nozzle with both thrust vectoring and variable exhaust area capabilities.

It is still another object of the present invention to provide a jet engine nozzle with thrust vectoring and variable exhaust area capabilities that has fewer moving parts than previously known nozzles.

It is yet another object of the present invention to provide a jet engine nozzle with thrust vectoring and variable exhaust area capabilities that is less expensive to make or maintain than previously known nozzles.

It is still yet another object of the present invention to provide a jet engine nozzle that improves the longitudinal stability of an aircraft.

It is still yet another object of the present invention to provide a jet engine nozzle that reduces the required landing speed of an aircraft.

It is still yet another object of the present invention to provide a jet engine nozzle that may be used to pitch and/or roll an aircraft.

Other objects, characteristics and advantages will become apparent from the following description in reference to the accompanying drawings.

SUMMARY OF THE INVENTION

The invention comprises a variable area exhaust nozzle with variable thrust vector angle for one or more jet engines having shells pivotally mounted on a fixed structure called jet pipe with two extending arms. The jet pipe with its extending arms and the pivoting shells form the exhaust nozzle of the engine. The shells are pivoted and controlled by actuator means which pivot the shells either to a symmetrical configuration for changing the value of the exhaust area of the nozzle or unsymmetrical configuration for changing the value of the angle of the thrust vector relative to the engine centerline. The actuator can be hydraulic, electric or pneumatic or other extendible actuators to provide controlled pivoting of the shells. In one embodiment there is a single actuator per shell, said actuator being connected to the jet pipe and the shell to provide controlled pivoting of said shell; in this embodiment, said actuator is located substantially in the vicinity of the plane of symmetry of said shell. In another embodiment there are dual actuators on each side of the jet pipe to provide controlled pivoting of the shells. The invention includes a method for adapting an exhaust nozzle mounted on the aft portion of a nacelle which wraps a turbo-fan engine, by varying the value of the exit area or by changing the thrust vector angle of said exhaust nozzle during a flight segment.

The method also includes varying the value of the exhaust area of the nozzle and the thrust vector angle on opposite side engines, whether said engines are aircraft wings mounted or fuselage mounted.

It is to be understood that both the foregoing general description and the following detailed description are exemplary and explanatory only, and are not restrictive of the invention as claimed. The accompanying drawings, which are incorporated herein by reference and which constitute a part of this specification, illustrate certain embodiments of the invention, and together with the detailed description serve to explain the principles of the present invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF EMBODIMENTS OF THE INVENTION

The exhaust system of the invention is described more fully as follows. U.S. Pat. No. 5,221,048 that discloses the variable exhaust area nozzle is incorporated in toto herein for all purposes by this specific reference thereto.

Figure 1:
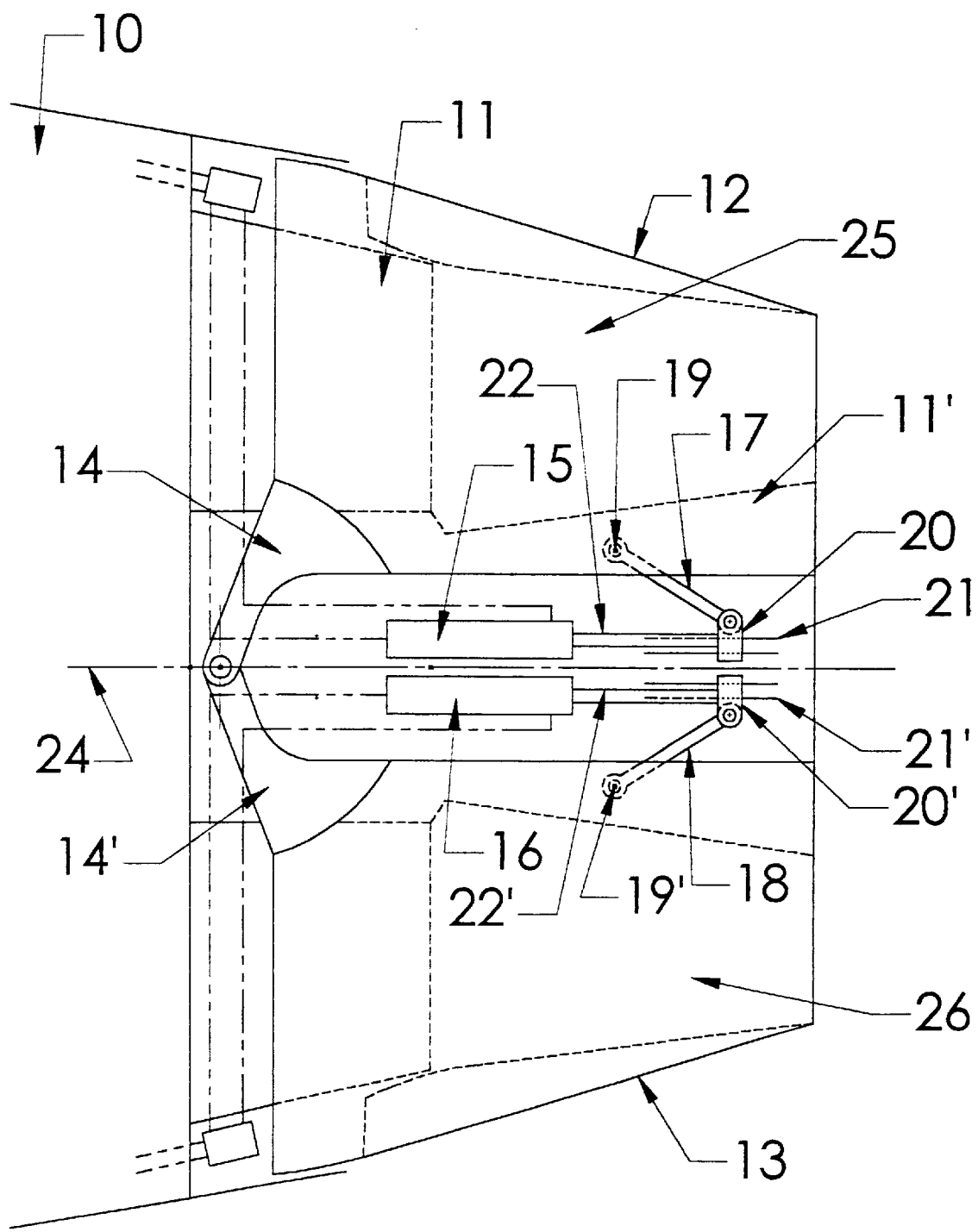
FIG. 1 is a schematic side view of a nozzle in accordance with a first embodiment of the present invention.

With reference to FIG. 1, in a first embodiment of the present invention, a thrust vectoring and variable exhaust area nozzle 10 for a jet engine such as a turbo-fan is provided by a fixed structure 11, first and second pivoting shell 12 and 13, a sealing system (shown in FIG. 15), and first and second actuators 15 and 16. The fixed structure 11, also called a jet pipe, is the structure that provides the support for the two pivoting shells 12 and 13, and for the actuators 15 and 16. The fixed structure 11 cooperates radially and longitudinally with the two pivoting shells 15 and 16 through a sealing arrangement that ensures fluid tightness between the respective elements.

With continued reference to FIG. 1, the rear (aft) end of the jet engine generally designated 10, includes a jet pipe 11 in which two radial cutouts 25 and 26 are provided. The radial cutouts 25 and 26 are defined by the jet pipe extensions 11' (only one of which is shown as a result of the side view of the nozzle). The first and second pivoting shells 12 and 13 close the jet pipe cutouts 25 and 26, and are pivotally mounted on said jet pipe 11 via shell hinge arms 14 and 14'. The pivoting shells 12 and 13 are shown in FIG. 1 to pivot about the same point. It is appreciated, however, that in an alternative embodiment, the pivoting shells 12 and 13 may each pivot about their own dedicated pivot points. The two pivoting shells 12 and 13, and the jet pipe 11 form the exhaust nozzle of the engine.

Each of the pivoting shells 12 and 13 includes an external profile and an internal profile. In FIG. 1, the external profile of the shells is shown to be convergent in the direction approaching the exhaust exit of the nozzle. The internal profile of the shells is also convergent, but to a lesser degree than the external profile.

The longitudinal axis of the engine 10 is indicated by the centerline 24. With respect to this longitudinal axis, each of the shells 12 and 13 includes a leading edge that is contained in a plane substantially perpendicular to the engine longitudinal axis and a longitudinal edge that is contained in a plane substantially parallel to a horizontal plane containing the engine longitudinal axis.

Figure 5:
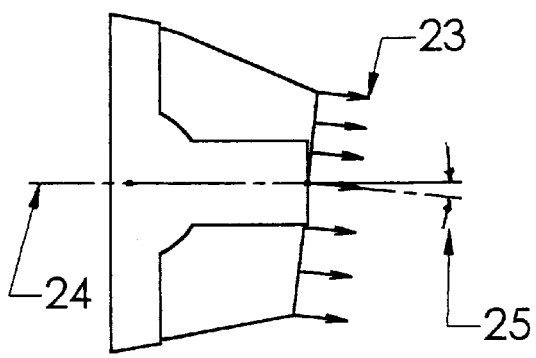
FIG. 5 is a schematic side view of the nozzle shown in FIG. 1 in a down thrust vector position.
Figure 6:
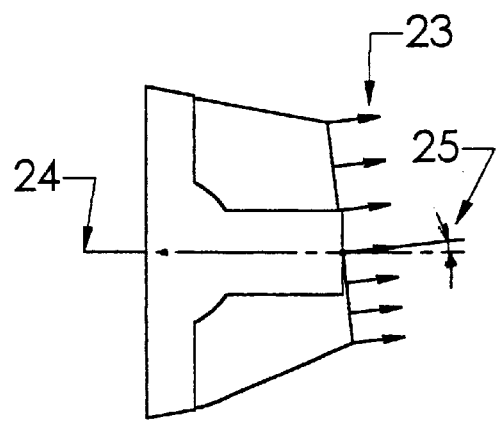
FIG. 6 is a schematic side view of the nozzle shown in FIG. 1 in an up thrust vector position.

First and second independently operated actuators 15 and 16 connect the jet pipe 11 to the first and second shells 12 and 13, respectively. In the embodiment shown in FIG. 1, the actuators 15 and 16 are connected to the shells 12 and 13 at a point that is along the longitudinal edge of the shells. The actuators provide the motion necessary to pivot of the shells about the pivot points at which they are connected to the jet pipe. The pivoting of the shells may be symmetrical (as shown in FIGS. 3 and 4) to provide variation of the exhaust area, or asymmetrical (as shown in FIGS. 5 and 6) to provide thrust vectoring.

As also shown in FIG. 1, each shell 12 and 13 is connected to its own actuator through an arm arrangement 17 and 18. One end 19 of the upper arm 17 is pivotally connected to the first shell 12 while the other end of the arm 17 is pivotally connected to the cross head 20 of the first actuator 15 of the first shell. One end 19' of the lower arm 18 is pivotally connected to the second shell 13 while the other end of the arm 18 is pivotally connected to the cross head 20' of the second actuator 16 of the second shell. The jet pipe 11 may be equipped with guiding rails 21 and 21'. Each of the guiding rails engages its respective actuator cross head 20 and 20'. This arrangement prevents any side loads in the piston rods 22 and 22' of the actuators. In this embodiment, each actuator 15 and 16 directly controls the position of one end of its respective arm 17 and 18, since the cross heads 20 and 20' are respectively attached to the piston rods 22 and 22' of their respective actuators 15 and 16.

Figure 2:
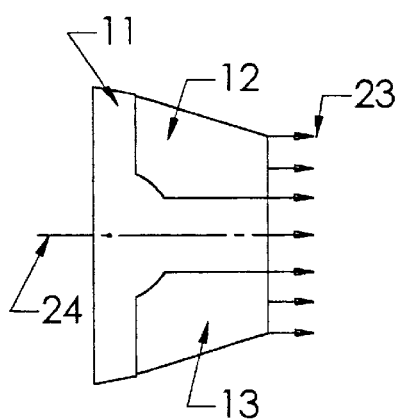
FIG. 2 is a schematic side view of the nozzle shown in FIG. 1 in a Nominal position.
Figure 3:
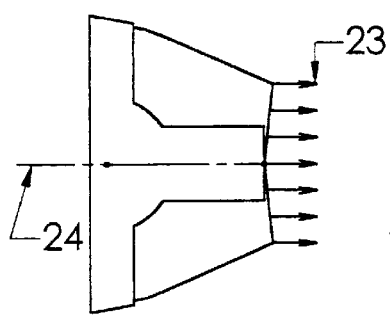
FIG. 3 is a schematic side view of the nozzle shown in FIG. 1 in a reduced exhaust area (closed) position.
Figure 4:
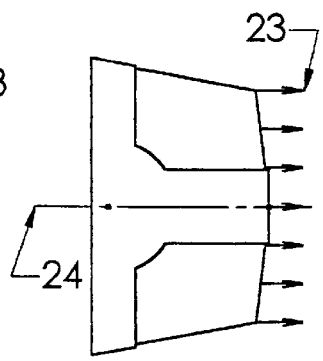
FIG. 4 is schematic side view of the nozzle shown in FIG. 1 in an increased exhaust area (opened) position.

With reference to FIGS. 2, 3, 4 and 7, the actuators 15 and 16, which control the value of the area of the exhaust nozzle, are activated symmetrically to provide one method of operation. This causes the actuators to provide a symmetrical rotation to the shells 12 and 13, so that the value of the exhaust area of the nozzle can be decreased as shown in FIG. 3 or increased as shown in FIG. 4. In these cases, the thrust vector 23 remains aligned parallel with the engine centerline 24.

Figure 7:
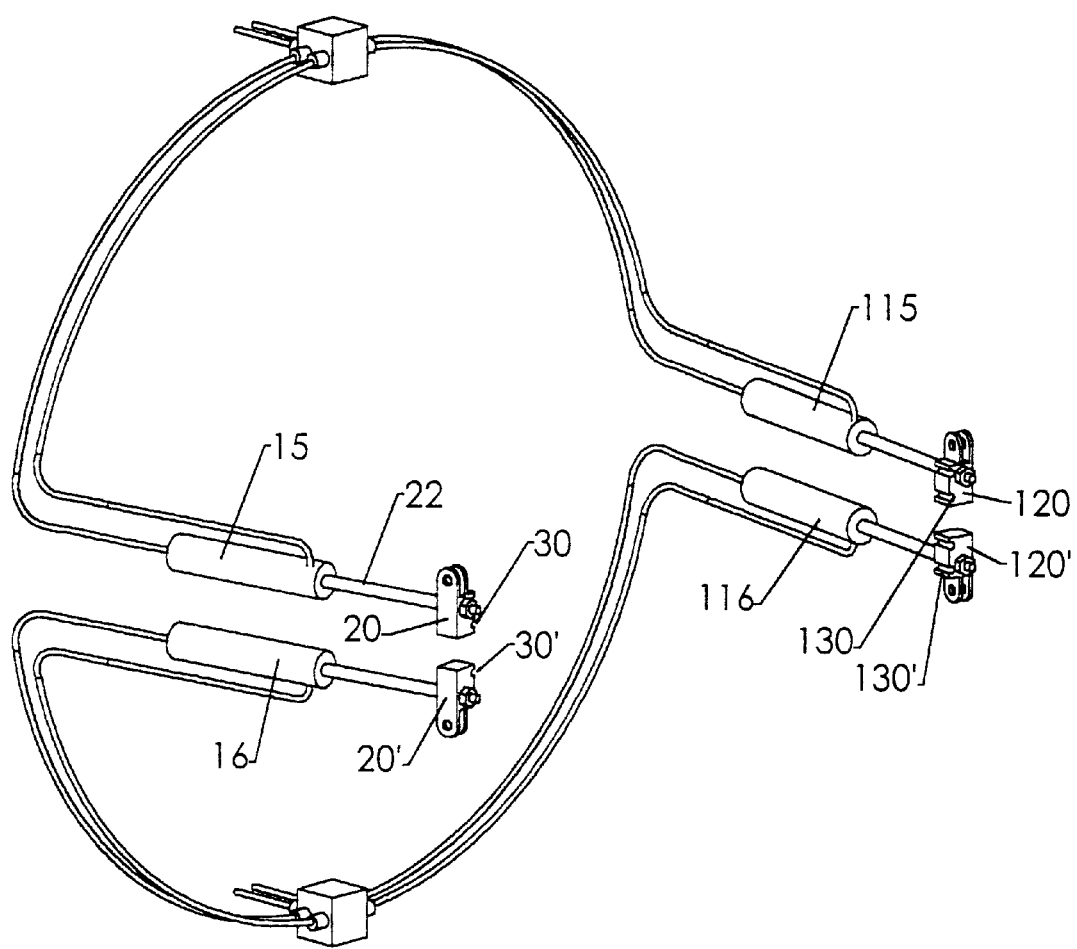
FIG. 7 is a schematic perspective view of the actuators that may be used to pivot the shells comprising the nozzle shown in FIG. 1, the actuators are shown in a Nominal position.

With reference to FIG. 7 the mechanism which controls the pivoting of the shells 12 and 13, as shown in FIGS. 2, 3 and 4, is composed of two identical independent pairs of actuators 15, 115 and 16, 116. Each actuator is connected to its respective cross heads 20, 120, 20' and 120'. The cross heads 20, 120, 20' and 120' have corresponding grooves 30, 30', 130 and 130' that slidably engage guiding rails 21 and 21' (shown in FIG. 1) attached to the jet pipe 11. It is appreciated that if the structural rigidity of each of the shells 12 and 13 is great enough, the actuators 115 and 116 may be eliminated and replaced by two arms and slots like the ones shown in FIG. 10. In such a case, the actuators would comprise the combination of two actuators 15, 16 as shown in FIG. 7, and the two arms 221, 223 guided by their respective slots 226, 229 as shown in FIG. 10.

Figure 8:
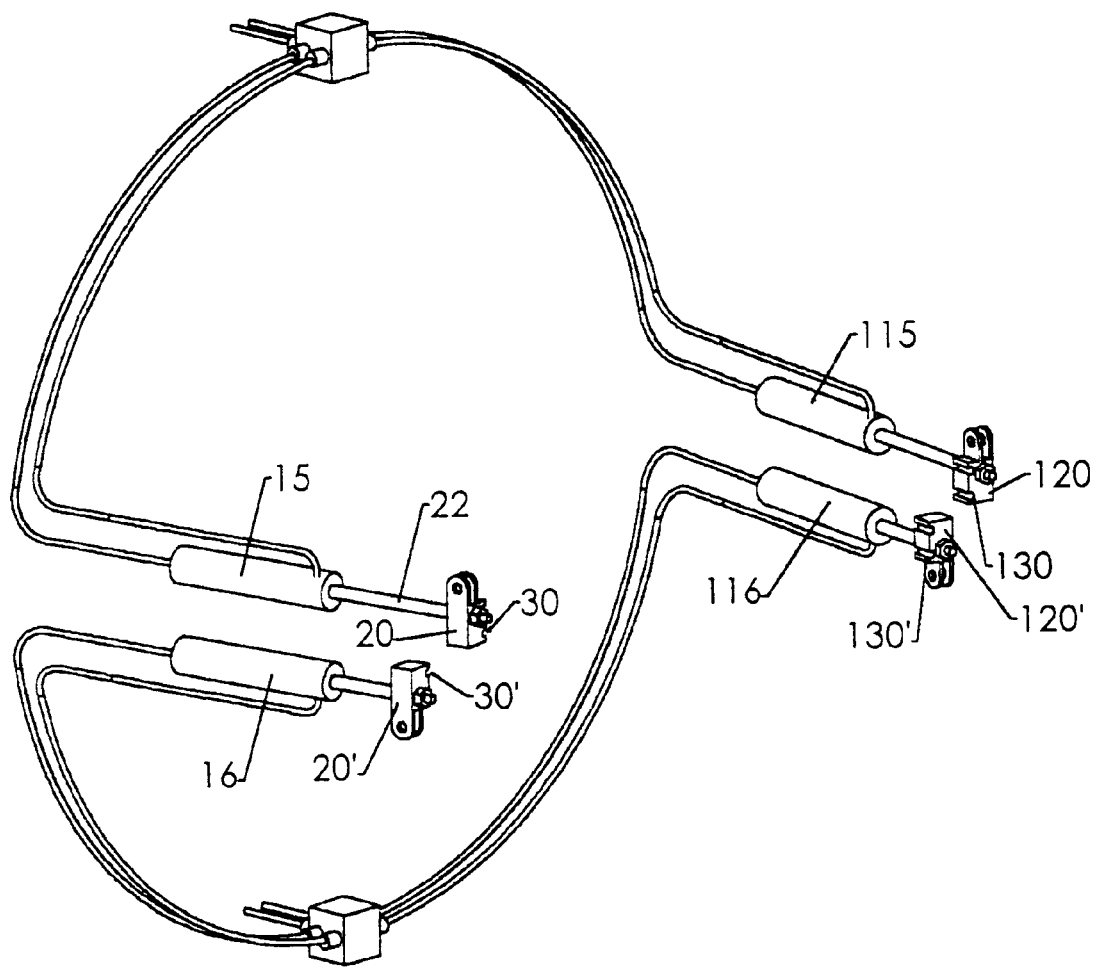
FIG. 8 is a schematic perspective view of the actuators shown in FIG. 7 in a thrust vector down position.
Figure 9:
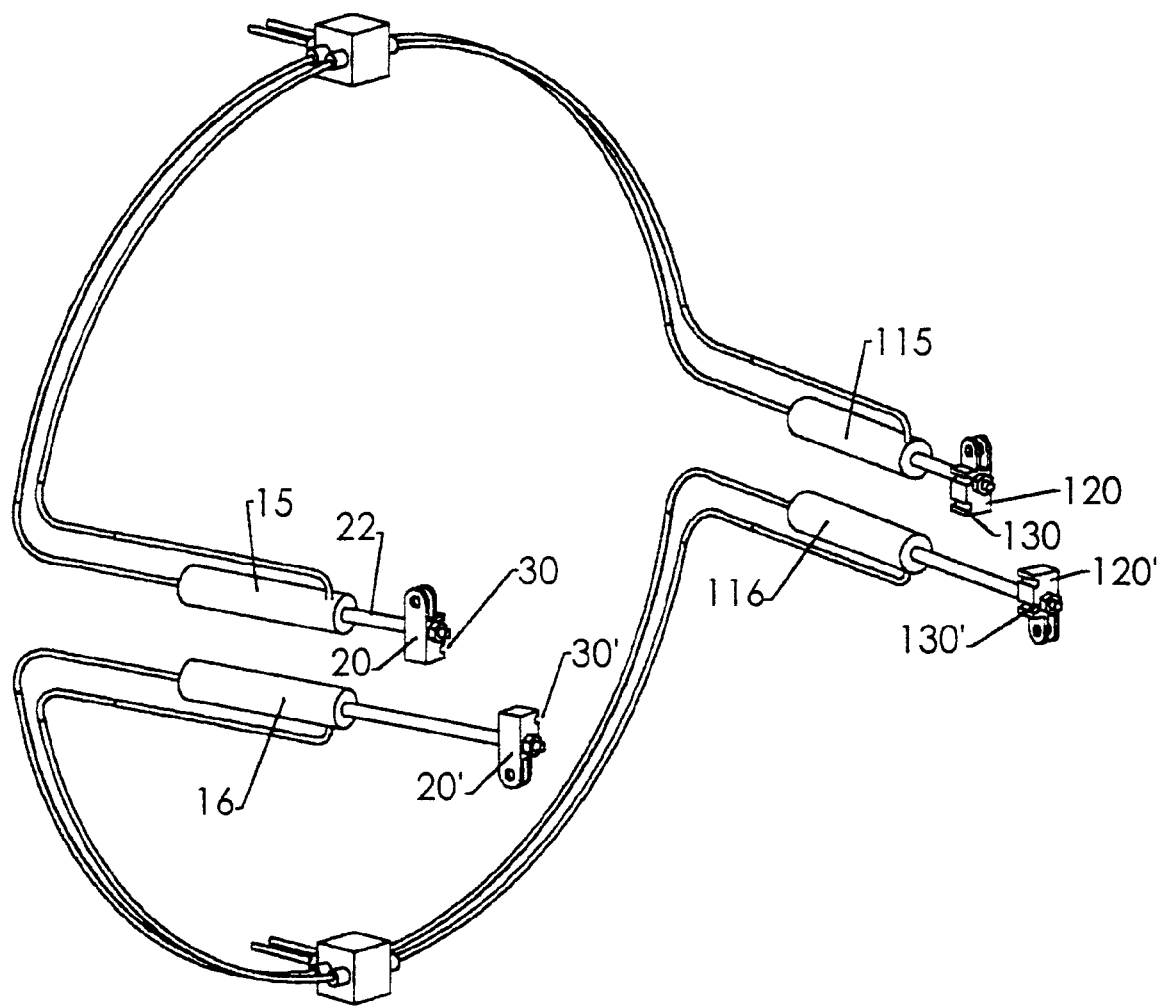
FIG. 9 is a schematic perspective view of the actuators shown in FIG. 7 in a thrust vector up position.

With reference to FIGS. 5 and 8, the actuators 15 and 16 may be activated non-symmetrically to pivot the shells 12 and 13 clockwise to produce a down thrust vector, as shown. With reference to FIGS. 6 and 9, the actuators 15 and 16, may be activated non-symmetrically to pivot the shells 12 and 13 counter-clockwise to produce an up thrust vector, as shown. It is apparent from FIGS. 7, 8 and 9 that the same actuators (15, 115 and 16, 116) are capable of two different functions to provide two methods of operation. One is to increase or decrease the value of the exhaust area of the exhaust nozzle without modification of the thrust vector angle (FIG. 7). The other one is to modify the angular position of the exhaust nozzle, i.e, providing it with a nozzle down position (FIGS. 5, 8) or a nozzle up position (FIGS. 6, 9).

Figure 10:
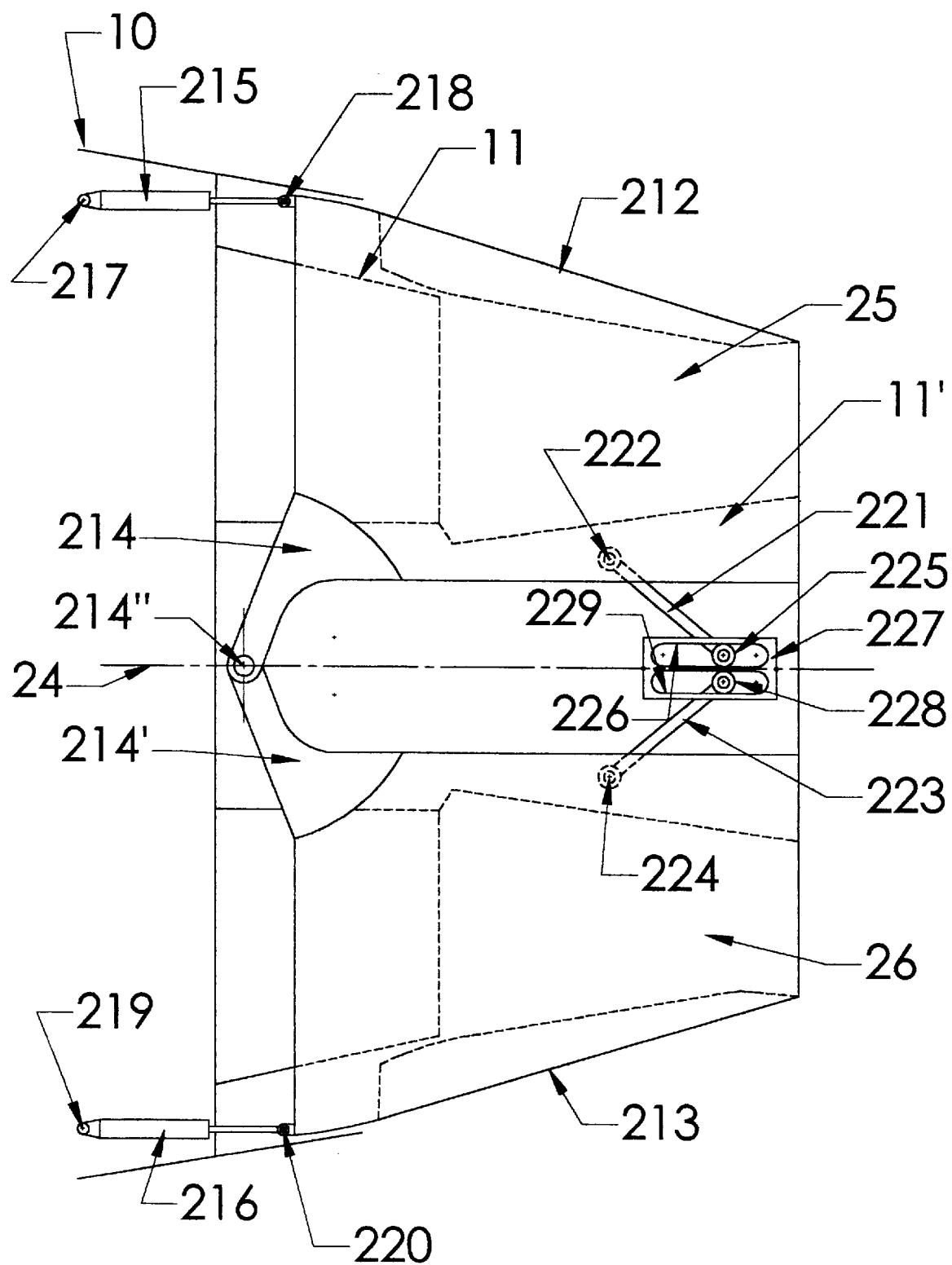
FIG. 10 is a schematic side view of a nozzle in accordance with a second embodiment of the present invention.
Figure 13:
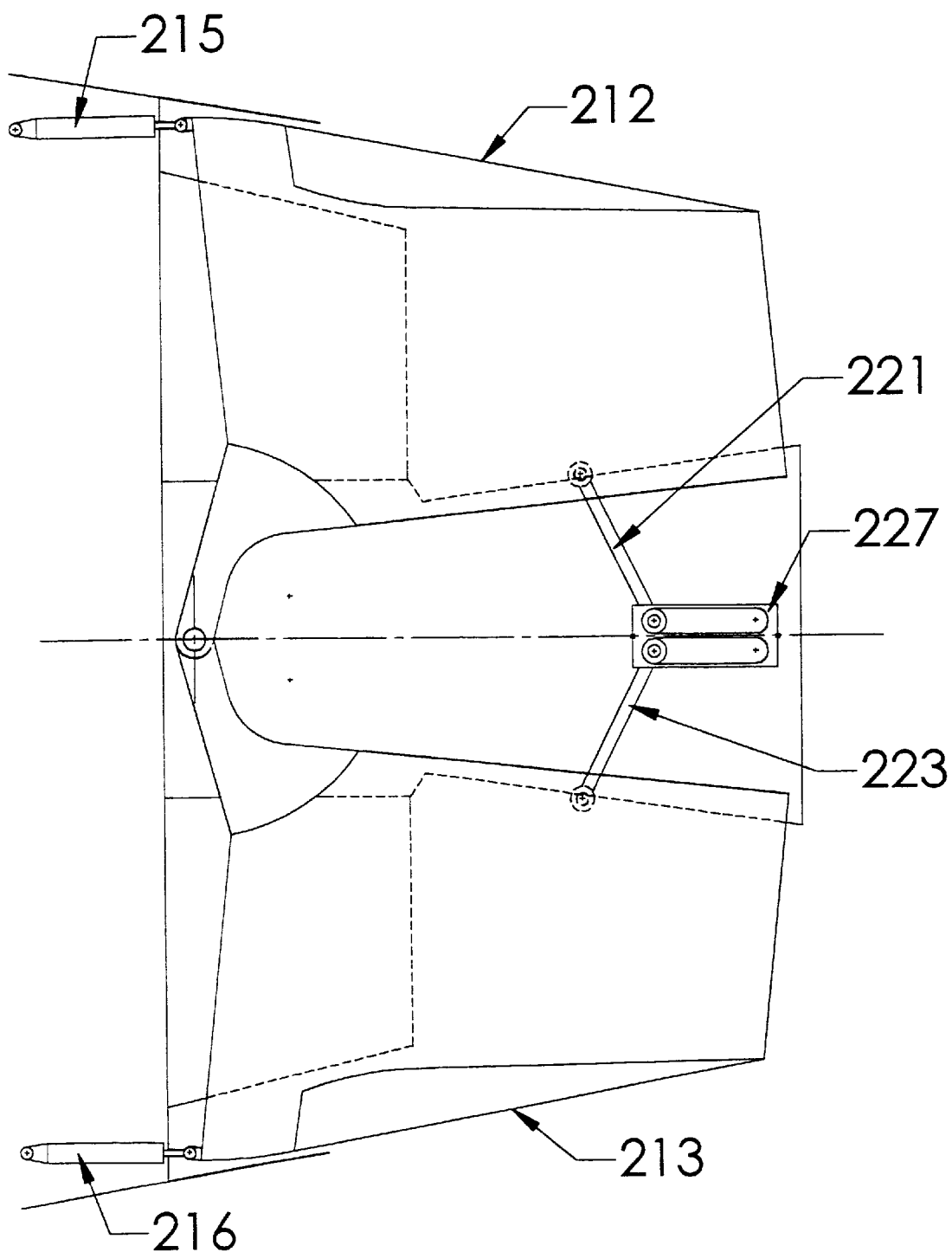
FIG. 13 is a schematic side view of the nozzle shown in FIG. 10 in the increased exhaust area (opened) position.
Figure 14:
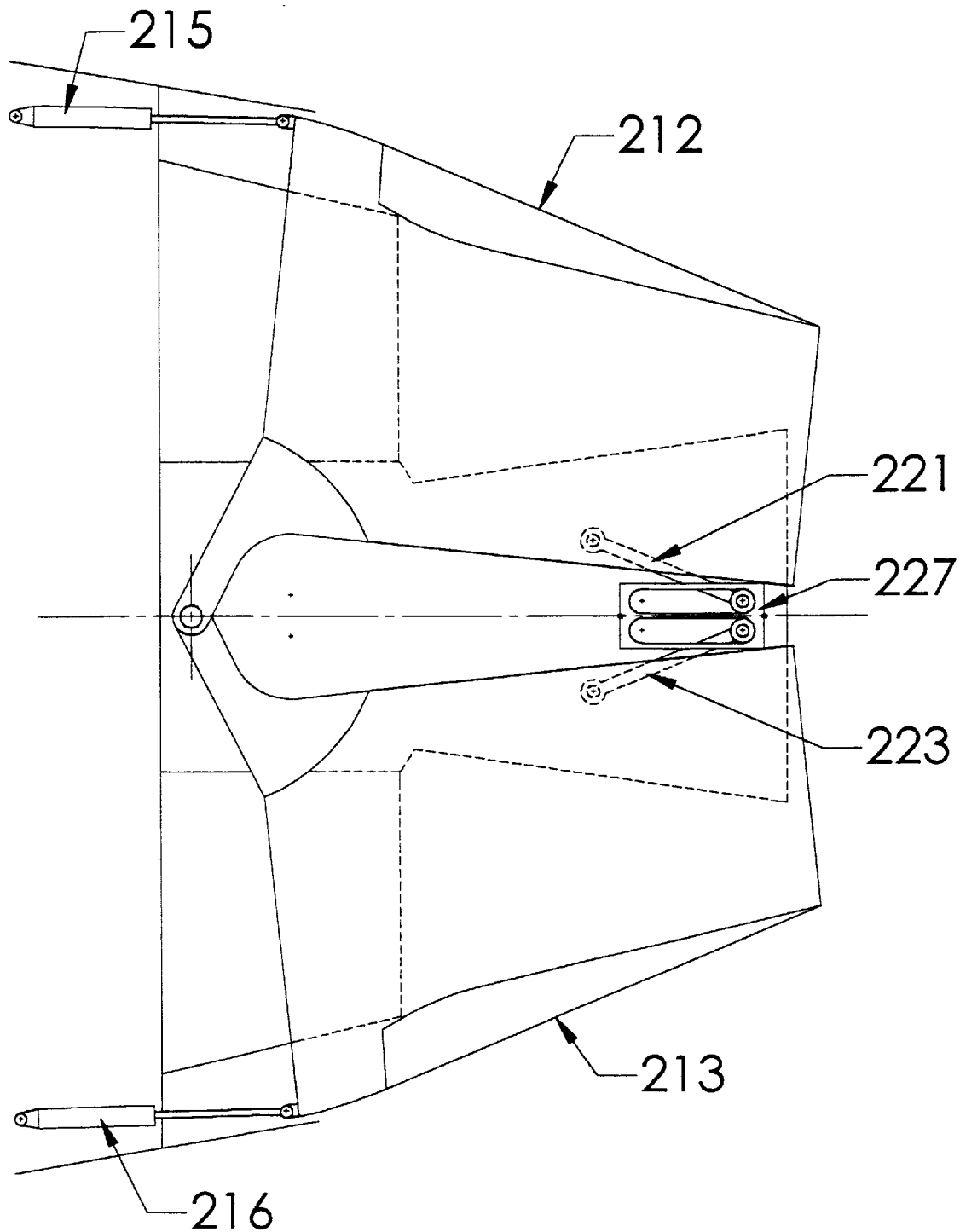
FIG. 14 is a schematic side view of the nozzle shown in FIG. 10 in the decreased exhaust area (closed) position.

With reference to FIG. 10, a second embodiment of the invention is shown in which like reference numerals refer to like elements. The difference between the embodiments shown in FIGS. 1 and 10 is that in the later embodiment the actuators 215 and 216 are connected to the shells 212 and 213 at points along the leading edge of the shells, and the later embodiment shows a nozzle with an internal convergent-divergent profile. The independent actuators 215 and 216 are connected to the jet pipe 11 through pivot connections 217 and 219, respectively. The actuators 215 and 216 are also connected to the shells 212 and 213 through pivot connections 218 and 220. As with the embodiment shown in FIG. 1, pivoting may be symmetrical to provide variable exit nozzle areas as shown in FIGS. 13 and 14. Alternatively, pivoting may be asymmetrical to vary the thrust vector angle as shown in FIGS. 11 and 12.

As also shown in FIG. 10, a first control arm 221 is pivotally connected to the first shell 212 through a pivot pin 222. A second control arm 223 is pivotally connected to the second shell 213 through a pivot pin 224. Guide roller 225 is pivotally connected to the end of the first control arm 221 and slidably positioned in the slot 226 in the guide bracket 227. The guide bracket 227 is connected to the extension arm 11' and its opposite (not shown) of fixed structure 11. The guide roller 228 is pivotally connected to the end of second control arm 223 and slidably positioned in the slot 229 in the guide bracket 227. The control arms 221 and 223 close the hoop loop between the two shells 212, 213, ensuring structural integrity of the assembly. The slots 226 and 229 define the pivoting limits of the shells 212 and 213. In this embodiment, each shell 212, 213 directly controls the position of its respective arm 221, 223. The shells 212 and 213 are connected via the hinge arms 214 and 214', respectively, to the same pivot point 214".

Figure 11:
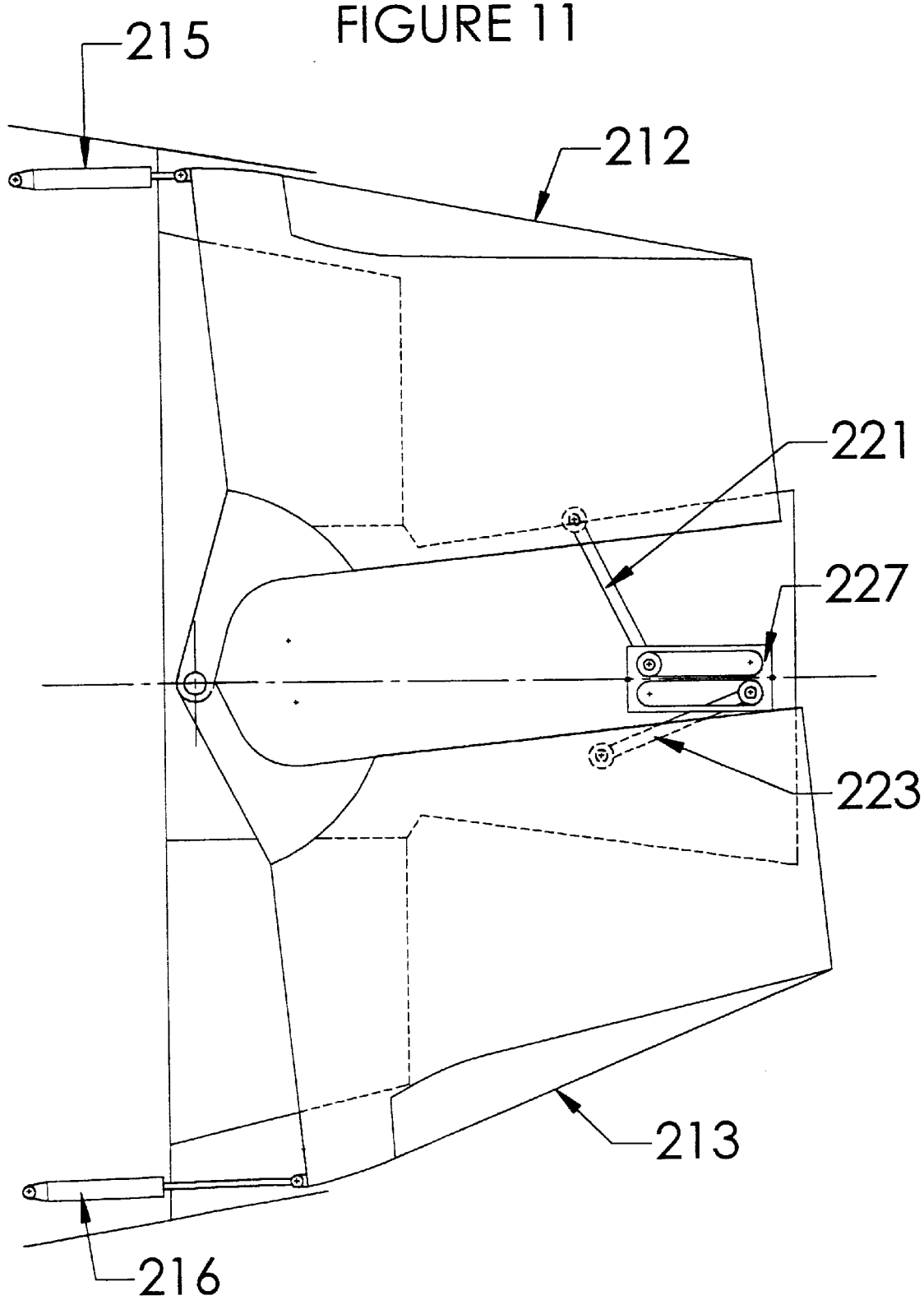
FIG. 11 is a schematic side view of the nozzle shown in FIG. 10 in a thrust vector up position.
Figure 12:
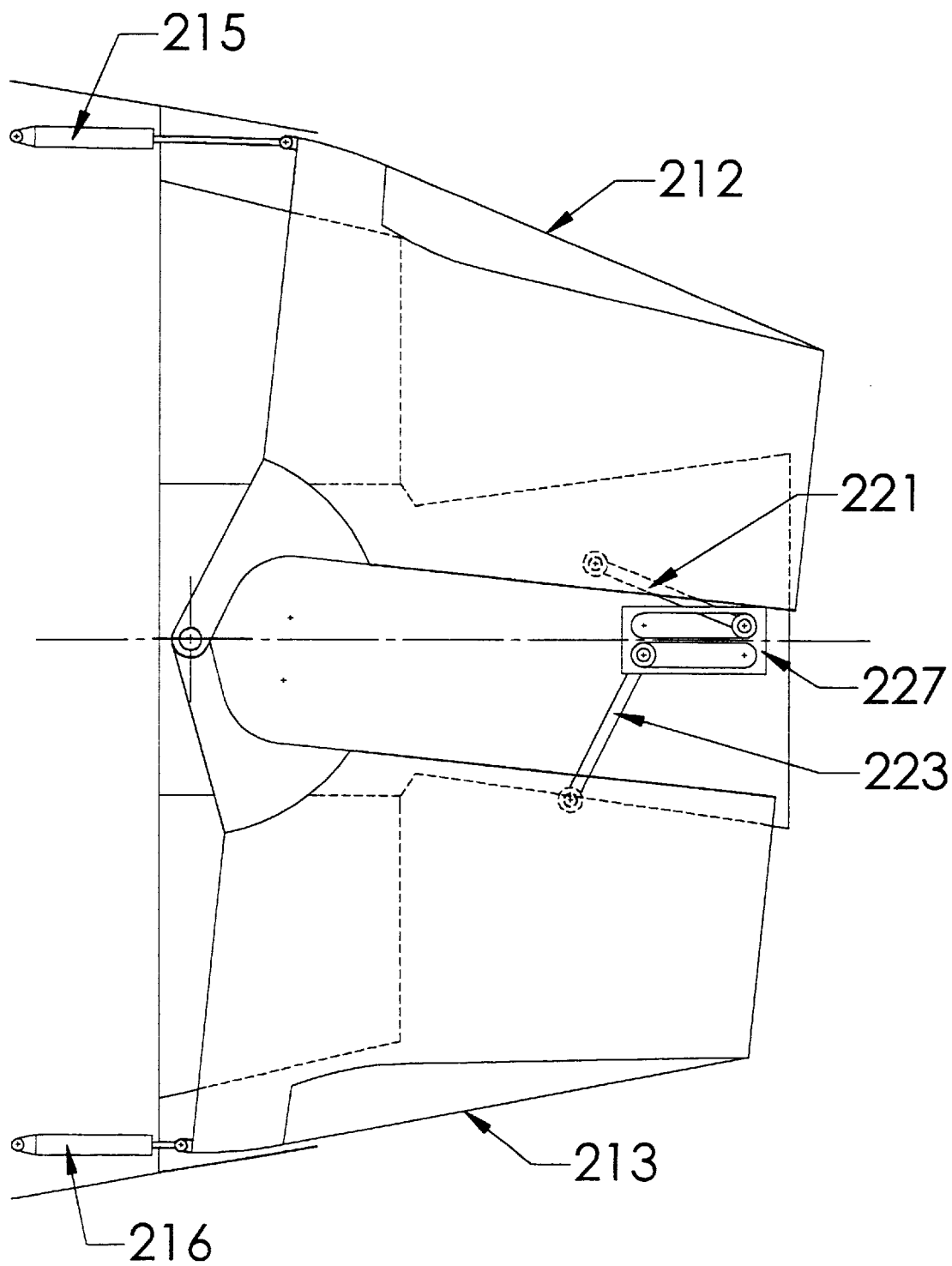
FIG. 12 is a schematic side view of the nozzle shown in FIG. 10 in a thrust vector down position.

With reference to FIGS. 11 and 12 the actuators 215 and 216 can be activated to control the angular position of the exhaust nozzle to rotate the nozzle to have a "nozzle up" or a "nozzle down" position.

Figure 15:
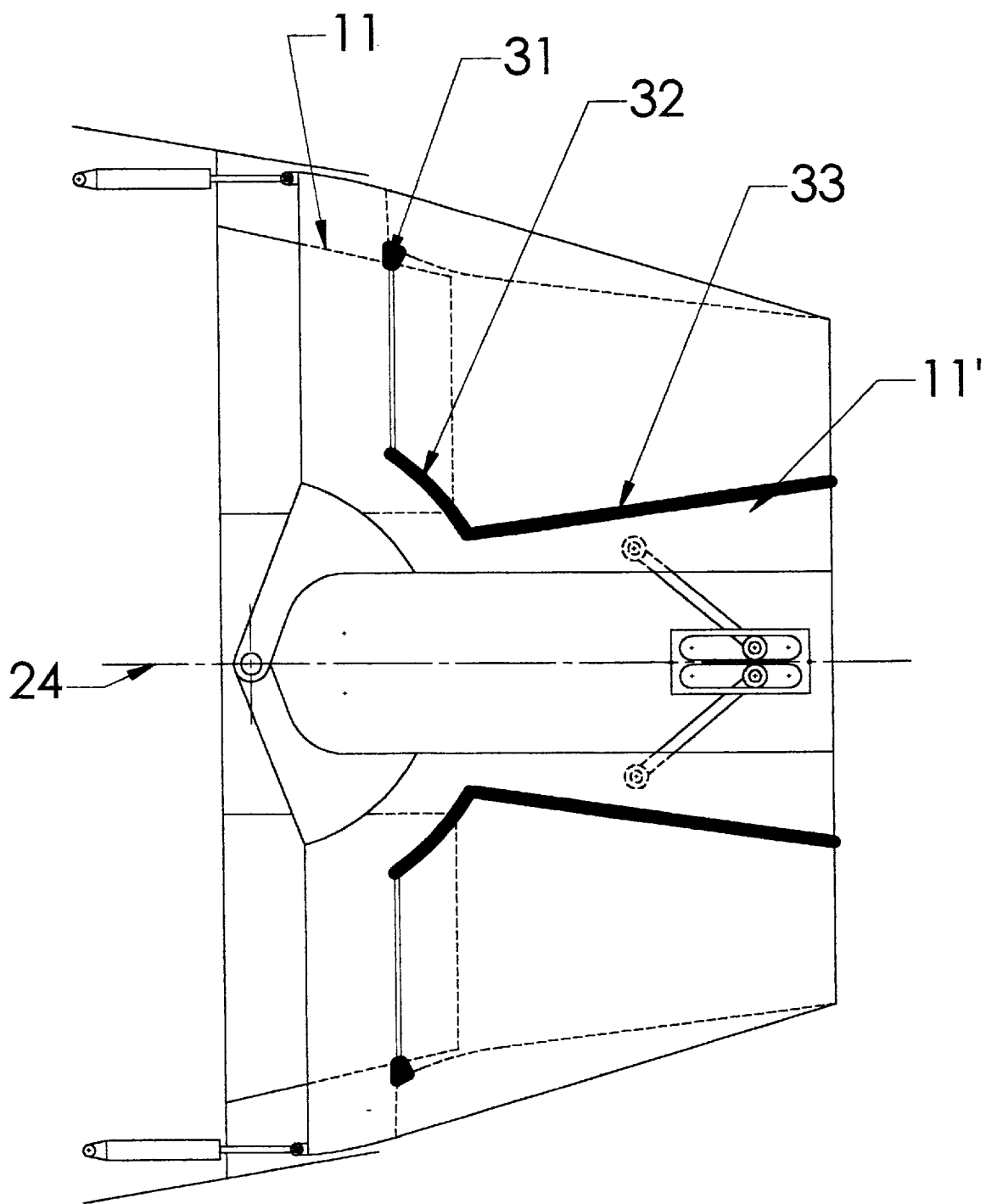
FIG. 15 is a schematic side view of the nozzles shown in FIGS. 1 and 10 showing the sealing arrangement.

With reference to FIG. 15, fluid tightness between the shells and the fixed structure is ensured by a sealing arrangement (symbolically shown) which is typically composed of a radial seal 31 mounted on each shell in the vicinity of their leading edge, a longitudinal seal 33 mounted along the edges of the jet pipe two extending arms, and a cylindrical seal 32 mounted on the jet pipe and connecting said longitudinal seals to said radial seals. So long as the function of said seals is not impaired, further variation of the sealing arrangement can be made. For example, all seals including the radial seals can be installed on the fixed jet pipe, or all seals can be installed on the pivoting shells. Although any type of seal shape can be used, it is advantageous to minimize their size as well as to use a seal material characterized by a low friction capability (Teflon coated, composite or other).

Figure 16:
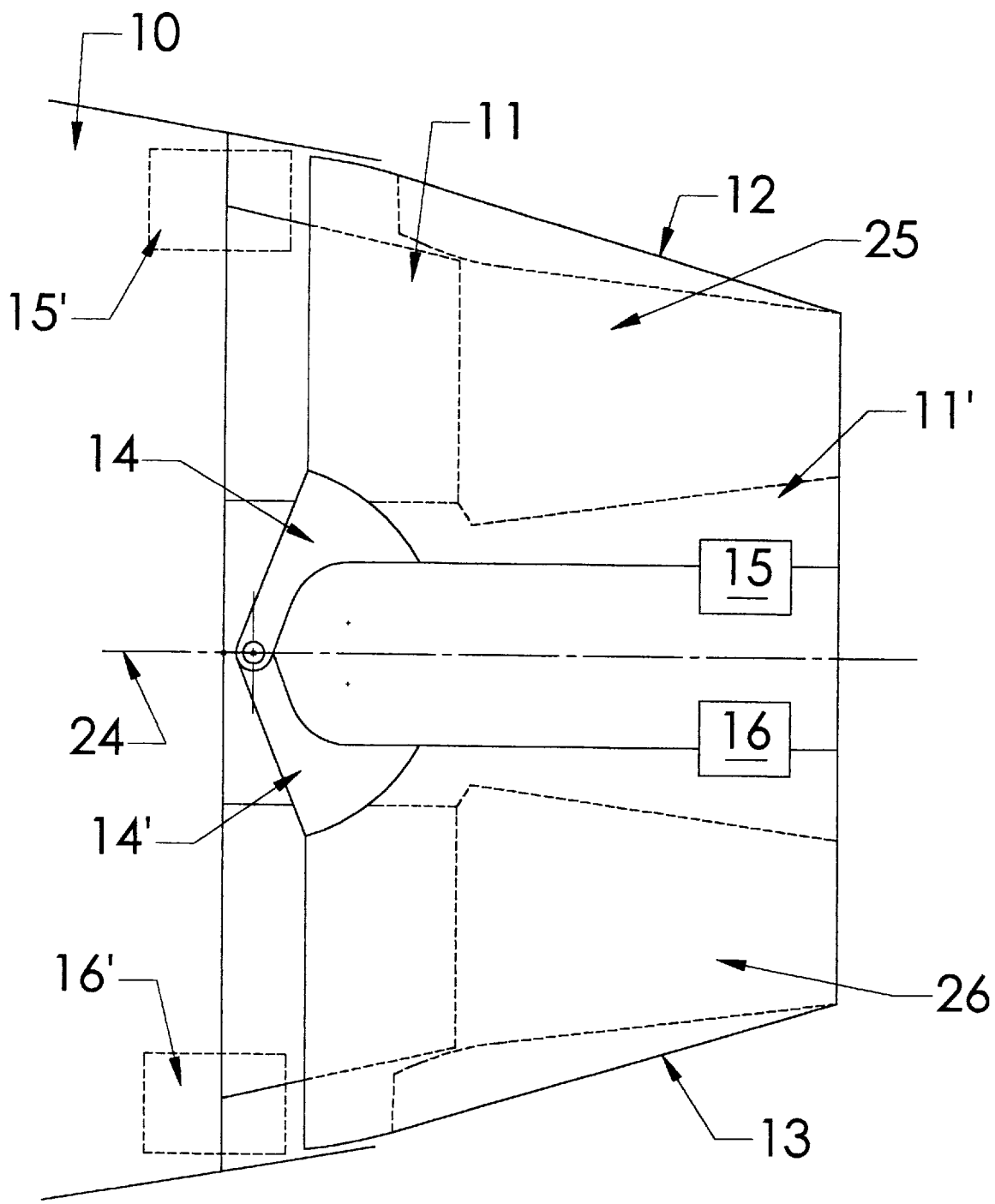
FIG. 16 is a schematic side view of a nozzle in accordance with an alternative embodiment of the present invention.

With reference to FIG. 16, it is shown that the position of the actuators 15, 15', 16, and 16' may be varied without departing from the intended scope of the invention. As indicated by showing the actuators as "black boxes," it is also appreciated that each may be any type of actuator, such as hydraulic, pneumatic or electric actuators. While a hydraulic actuator is shown with a piston rod in FIGS. 1 and 10, a screw type actuator can be used to provide the pivoting motion to the shells. A standard control system including a computer can be used to provide controlled movement to the actuator systems during flight.

In the various embodiments of the present invention, the two shells 12 and 13 and 212 and 213 are pivotally mounted on two hinge clevises, each of said clevises being supported and attached to the fixed jet pipe, and substantially diametrically opposed. An independent actuator attached to the jet pipe controls each shell. The actuators can either be symmetrically or asymmetrically controlled. When the actuators are symmetrically operated they provide a symmetrical rotation to the shells around their pivots. The two shells rotate away from one another to cause the value of the exhaust area of the nozzle to be increased or towards each other to cause the value of the exhaust area of the nozzle to be decreased. This symmetrical operation of the shells provides the variable nozzle area function of the apparatus. When each of the actuation means are operated in asymmetrically, the shells rotate around their pivots to provide an off-angle thrust vector (whether it be up, down, left, or right). This asymmetrical operation of the shells provides the thrust vectoring function of the apparatus.

The pivoting shells allowing the execution of the nozzle area variation as well as the modification of the angle of the thrust vector in an upwards or downwards position are mounted on the jet pipe such that their hinge axis is substantially diametrical along the 3:00 o'clock–9:00 o'clock direction. It is appreciated, however, that the pivoting shells may be mounted side-by-side, such that their hinge axis is substantially diametrical along the 6:00 o'clock–12:00 o'clock direction. It is further appreciated that the pivoting shells may be mounted at any intervening angle between the afore-described horizontal and vertical positions.

Variations in the type and location of the actuators used may be made without departing from the scope and spirit of the present invention. For example, linear, gear driven, electro-mechanical, hydraulic, or pneumatic actuators may be used without departing from the scope of the invention. Furthermore, variations in the shape and relative dimensions of the shells used may be made without departing from the intended scope of the invention. For example, although it is expected that the preferred shape of the exhaust area of the nozzle will be circular, it is also appreciated that non-circular areas may be used in some circumstances without departing from the scope of the present invention. Thus, this application and the appended claims are intended to cover any and all variations, modifications and adaptations as may fall within the spirit of the invention.

I claim:

1. A jet engine nozzle mounted on an aft portion of an engine jet pipe and adapted to provide a variable exhaust area and a variable thrust vector angle, said nozzle comprising:

a first shell connected at two first fixed pivot points to the jet pipe;

a second shell connected at two second fixed pivot points to the jet pipe;

a first actuator connecting the first shell to the jet pipe and adapted to pivot the first shell about the first pivot points, said first shell having a first hinge arm with a distal end and being pivotally connected to the jet pipe at the first hinge arm distal end; and a second actuator connecting the second shell to the jet pipe and adapted to pivot the second shell about the second pivot points, said second shell having a second hinge arm with a distal end and being pivotally connected to the jet pipe at the second hinge arm distal end, wherein the pivoting axis of the first shell and the second shell is substantially horizontal to provide vertical variation of the thrust vector angle.

2. The nozzle of claim 1 wherein the two first pivot points and the two second pivot points are coincident.

3. The nozzle of claim 1 wherein the first and second shells have an external profile and an internal profile, and wherein the internal profile of the shells is convergent-divergent.

4. The nozzle of claim 1 further comprising means for sealing the first and second shells against the jet pipe.

5. The nozzle of claim 1 wherein the first and second actuators comprise linear actuators.

6. The nozzle of claim 1 wherein the engine has a longitudinal axis,
wherein the first and second shells each have a leading edge contained in a plane substantially perpendicular to a plane containing the engine longitudinal axis, and
wherein the first actuator is connected to the first shell in the vicinity of its leading edge and the second actuator is connected to the second shell in the vicinity of its leading edge.

7. The nozzle of claim 6 wherein the first and second shells each have longitudinal edges contained in a plane substantially parallel to a plane containing the engine longitudinal axis, and further comprising:
a first control arm connecting a point along the first shell longitudinal edge to the jet pipe; and
a second control arm connecting a point along the second shell longitudinal edge to the jet pipe.

8. The nozzle of claim 1 wherein the engine has a longitudinal axis,
wherein the first and second shells each have longitudinal edges contained in a plane substantially parallel to a plane containing the engine longitudinal axis, and
wherein the first actuator is connected to a point along the first shell longitudinal edge and the second actuator is connected to a point along second shell longitudinal edge.

9. The nozzle of claim 1 further comprising hinges connecting the first and second shells to the jet pipe at the first and second pivot points.

10. The nozzle of claim 1 wherein the first and second shells cooperate to provide a substantially circular exhaust area throughout a variable thrust vector angle range of motion.

11. The nozzle of claim 1 wherein the first and second shells have an external profile and an internal profile, and
wherein the internal profile of the shells is convergent.

12. A turbo-fan engine nozzle mounted on an aft portion of an engine jet pipe and adapted to provide a variable exhaust area and a variable thrust vector angle, said nozzle comprising:
a first shell having a first hinge arm with a distal end, said first shell being pivotally connected to the jet pipe at the first hinge arm distal end;
a second shell having a second hinge arm with a distal end, said second hinge arm being pivotally connected to the jet pipe at the second hinge arm distal end;
a first actuator connecting the first shell to the jet pipe; and
a second actuator connecting the second shell to the jet pipe,
wherein the pivoting axis of the first shell and the second shell is substantially horizontal to provide vertical variation of the thrust vector angle.

13. The nozzle of claim 12 wherein the first and second actuators are longitudinally spaced from the ends of the shell hinge arms connected to the jet pipe.

14. The nozzle of claim 12 wherein the first and second actuators are vertically spaced from the ends of the shell hinge arms connected to the jet pipe.

* * * * *